United States Patent [19]
Chipper

[11] Patent Number: 5,973,827
[45] Date of Patent: Oct. 26, 1999

[54] REFRACTIVE/DIFFRACTIVE INFRARED IMAGER AND OPTICS

[75] Inventor: Robert B. Chipper, Allen, Tex.

[73] Assignee: Raytheon Company, Lexington, Mass.

[21] Appl. No.: 09/009,323

[22] Filed: Jan. 20, 1998

Related U.S. Application Data

[60] Provisional application No. 60/041,734, Mar. 27, 1997.

[51] Int. Cl.$^6$ .......................... G02B 13/14; G02B 27/44; G02B 5/18; G02B 5/32
[52] U.S. Cl. .......................... 359/356; 359/565; 359/19; 359/16
[58] Field of Search .................................. 359/19, 15, 16, 359/565, 566, 558, 355, 356, 357

[56] References Cited

U.S. PATENT DOCUMENTS

| | | | |
|---|---|---|---|
| 3,961,851 | 6/1976 | Gerharz | 356/1 |
| 4,341,447 | 7/1982 | Biber | 354/25 |
| 4,374,189 | 2/1983 | Heller et al. | 430/2 |
| 4,951,214 | 8/1990 | Hollister | 365/460 |
| 4,988,189 | 1/1991 | Kroupa et al. | 356/4 |
| 5,044,706 | 9/1991 | Chen | 359/357 |
| 5,047,783 | 9/1991 | Hugenin | 342/179 |
| 5,148,209 | 9/1992 | Subbarao | 354/400 |
| 5,148,314 | 9/1992 | Chen | 359/16 |
| 5,153,772 | 10/1992 | Kathman et al. | 359/364 |
| 5,257,133 | 10/1993 | Chen | 359/356 |
| 5,442,480 | 8/1995 | Swanson et al. | 359/356 |
| 5,479,360 | 12/1995 | Seif et al. | 364/156 |
| 5,483,241 | 1/1996 | Waineo et al. | 342/29 |
| 5,493,441 | 2/1996 | Chipper | 359/354 |
| 5,504,628 | 4/1996 | Borchard | 359/796 |
| 5,537,245 | 7/1996 | Migozzi | 359/356 |
| 5,555,479 | 9/1996 | Nakagiri | 359/355 |

(List continued on next page.)

FOREIGN PATENT DOCUMENTS

| | | |
|---|---|---|
| 0461856A1 | 12/1991 | European Pat. Off. . |
| 0532267A1 | 3/1993 | European Pat. Off. . |

OTHER PUBLICATIONS

Swanson, et al,"Diffractive Optical Elements for Use in Infrared Systems", Optical Engineering, Jun. 1989, vol. 28 No. 6, cover pages and pp. 605–608.

Stallard, David V., "An Angle–Only Tracking Filter in Modified Spherical Coordinates", American Institute of Aeronautics and Astronautics, 1987, pp. 542–550.

Aidala, et al. "Biased Estimation Properties of the Pseudo-linear Tracking Filter", IEEE Transactions on Aerospace and Electronic Systems, vol. AES–18, No. 4, Jul. 1982, pp. 432–441.

Hammel, et al., "Observability Requirements for Three–Dimensional Tracking via Angle Measurements", IEEE Transactions on Aerospace and Electronic Systems, vol. AES–21 No. 2, Mar. 1985, pp. 200–207.

Mood, et al., "Introduction to the Theory of Statistics", 3rd Edition, McGraw–Hill, 1974, p. 181.

Primary Examiner—Jon Henry
Attorney, Agent, or Firm—Baker & Botts, L.L.P.

[57] ABSTRACT

This patent teaches a low cost imager. The imager has an refractive objective lens 10 having a surface with a color correcting diffractive pattern 16 and an infrared transmitting polymeric field lens 18 having a substantially flat surface with a first field-correcting diffractive pattern. In this imager, the first field-correcting diffractive pattern operates to reduce aberrations of an image. In some embodiments, the imager further has a second field-correcting diffractive pattern on the field lens, where the first and second field-correcting diffractive pattern cooperating to reduce aberrations of the image. Additionally, this patent teaches a refractive/diffractive achromatic lens group 30. This achromat 30 can be used in the disclosed imager or in other optical devices. The achromatic group 30 has a refractive lens 10 and a lens 28 having a substantially flat surface with a surface diffractive pattern 16, the surface diffractive pattern cooperating with the refractive lens to reduce chromatic aberrations. Preferably, the second lens is formed from a polymeric sheet. These optics of the present invention can be used in infrared or visible optical devices.

38 Claims, 11 Drawing Sheets

U.S. PATENT DOCUMENTS

| | | | |
|---|---|---|---|
| 5,737,120 | 4/1998 | Arriola | 359/566 |
| 5,737,125 | 4/1998 | Ohashi | 359/566 |
| 5,796,514 | 8/1998 | Chipper | 359/354 |
| 5,818,632 | 10/1998 | Stephenson | 359/355 |
| 5,629,074 | 5/1997 | Klocek et al. | 359/356 |
| 5,666,221 | 9/1997 | Anderson et al. | 359/356 |

REFRACTIVE/DIFFRACTIVE INFRARED IMAGER AND OPTICS

This application claims priority under 35 USC §119 of provisional application No. 60/041,734 filed Mar. 27, 1997.

RELATED APPLICATIONS

The following co-assigned U.S. patent applications are incorporated by reference:

Ser. No. 08/289,404 (U.S. Pat. No. 5,629,074) Filing Date Aug. 12, 1994 Title Durable Polymeric Optical Systems

TECHNICAL FIELD OF THE INVENTION

This invention relates to an infrared imaging lens system and, more specifically, to an IR imager using diffractive surfaces to correct for color and/or field aberrations.

BACKGROUND OF THE INVENTION

It is known that different frequencies of light do not focus at the same location after passing through a lens. For this reason, color correction has been built into prior art lens systems. This is true not only for lens systems that focus visible light, but also for infrared lens systems. A typical infrared (IR) system operates over a moderate waveband, such as approximatelyx3–5 microns or 8–12 microns. Additionally, most lenses, particularly lenses with spherical surfaces, introduce field aberrations including astigmatism and coma.

FIG. 1 shows a conventional single field-of-view (FOV) imager. It includes 3 refractive elements, the objective 10, color corrector lens 12, and a field lens 14. The objective lens 10 is the primary focusing element which has the most power and is a converging lens. The objective lens collects the light from the desired object to be imaged and focuses this energy onto the detector. The objective lens is commonly made from germanium, due to germanium's high refractive index and low dispersion. Dispersion is the variation of refractive index with wavelength causing each wavelength to focus at a slightly different location. For an 8–12 micron waveband, these multiple foci would cause a blurring of the image. Thus, a color correcting lens is needed. The color corrector lens 12 is a negatively powered highly dispersive material used to bring all desired wavelengths of light to a common focus. The color corrector lens is typically made from zinc selenide. The field lens 14 is a positively powered lens used to correct field or image aberrations such as astigmatism and/or coma. The field lens is typically made from germanium.

SUMMARY OF THE INVENTION

The terms diffractive optics or diffractive optical elements refer to those optical elements that base their operation on the utilization of the wave nature of light. This broad categorization can be divided into several subsections. Diffractive lenses are elements that perform functions similar to conventional refractive lenses, e.g., they form an image. Kinoforms are diffractive elements whose phase modulation is introduced by a surface relief pattern. Binary optics are kinoforms produced by photolithographic techniques, resulting in a "stair-step" approximation to the desired profile. Each photolithography step increases the number of levels in the surface by a factor of two, hence the term binary optics. Kinoforms are highly efficient diffractive elements. Two references on this topic are "Binary Optics" by Veldkamp et al., Scientific American, May, 1992, pp. 92–97 and "Diffractive Optical Elements For Use In Infrared Systems" by Swanson et al., Optical Engineering vol. 28. No. 6, June, 1989, pp. 605–608. Recently, Veldkamp has used photolithography to approximate the kinoform surface profile. More recently, we have used diamond point turning (DPT) to create the proper kinoform surface for long wavelength (10 micron) IR optics, bypassing the binary approximation.

Due to their dispersive nature, diffractive elements can be used for color correction. Diffractive optical elements are highly dispersive in that they break up white light into its component colors from red at one end of the spectrum to blue at the other end. This dispersion is opposite in sign to that of most glasses and will cancel that of most conventional lenses. Therefore, over a small wavelength band, by combining conventional optics with diffractive optics, the chromatic aberration resulting from the dispersive characteristic of the glass can be reduced.

Typically, on a glass lens, the diffractive surface is a kinoform produced by diamond point turning, patterned and etched, or the like. Kinoforms are diffractive elements whose phase modulation is introduced by a surface relief pattern. The diffractive optical surface results in a step function whose surface is cut back by precisely one wavelength of the light frequency of interest (preferably 10 microns for operation in the 8 to 12 micron range) every time their thickness increases by that amount. The pattern required to yield the holographic element is provided by adding an additional term to the aspheric equation which provides a phase shift thereto.

FIG. 2 illustrates one approach to simplifying the conventional design. This improved design is similar to the conventional design, except that it replaces the color correcting lens with a diffractive surface 16 on the objective lens 10. The diffractive surface 16 is typically diamond-point turned onto the second surface of the objective lens. In the FIG. 2 design, the diffractive surface 16 is used for color correction only.

An infrared imager is disclosed. The imager comprises a refractive objective lens, such as an infrared transmitting glass lens, having a surface with a color correcting diffractive pattern and an infrared transmitting polymeric field lens having a substantially flat surface with a first field-correcting diffractive pattern, where the first field-correcting diffractive pattern operates to reduce aberrations of an image. In some embodiments, the imager further comprises a second field correcting diffractive pattern on the field lens, the first and second field-correcting diffractive pattern cooperating to reduce aberrations of the image. Preferably, the objective lens is a glass lens with the glass selected from the group consisting of (Se, chalcogenide glass, ZnS, ZnSe, GaAs, and TI-1173 glass.

Another infrared imager is disclosed. The imager comprises an infrared transmitting achromatic lens group. This achromatic group comprises a refractive objective lens, such as an infrared transmitting glass lens, and a second infrared transmitting lens. The second infrared transmitting lens has a substantially flat surface with a surface diffractive pattern, the surface diffractive pattern cooperating with the refractive lens to reduce chromatic aberrations. The imager further comprises an infrared transmitting polymeric field lens. The field lens has a substantially flat surface with a first field-correcting diffractive pattern, where the first field-correcting diffractive pattern operates to reduce aberrations of an image. In some embodiments, the field lens further comprises a second field-correcting diffractive pattern, the first and second field-correcting diffractive pattern cooperating to reduce aberrations of the image.

In some embodiments, either of these imagers further comprise one or more fold mirrors, windows, and/or filters. In some embodiments, the imager further comprises a chopper between the field lens and the image plane. The chopper may block or reflect the optical energy, or could comprise one or more optical elements that spoil or defocus the image. In some embodiments, flat surfaces that do not comprise diffractive surfaces comprise antireflective sub-wavelength structures.

An infrared transmitting achromatic lens group is disclosed. The achromatic group comprises an infrared transmitting refractive objective lens, such as an infrared transmitting glass lens, and a second infrared transmitting lens having a substantially flat surface with a surface diffractive pattern, the surface diffractive pattern cooperating with the refractive lens to reduce chromatic aberrations. Preferably, the second infrared transmitting lens is a polymeric sheet lens.

DETAILED DESCRIPTION OF THE INVENTION

Figure 1:
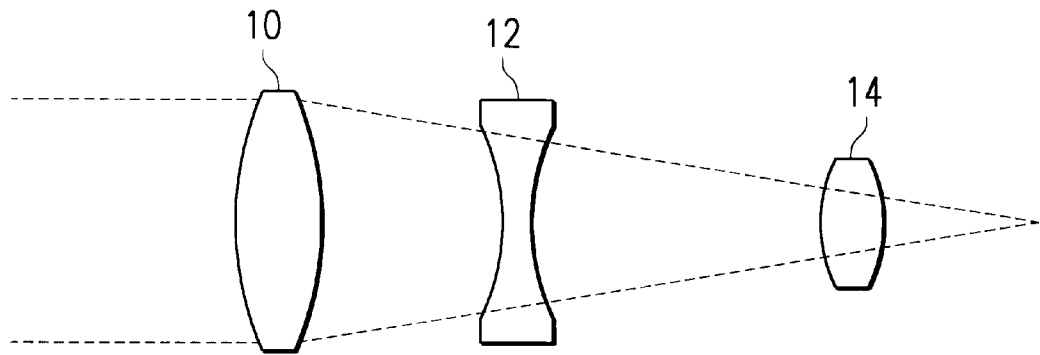
FIG. 1 shows a simplified view of a conventional single field-of-view (FOV) imager.
Figure 2:
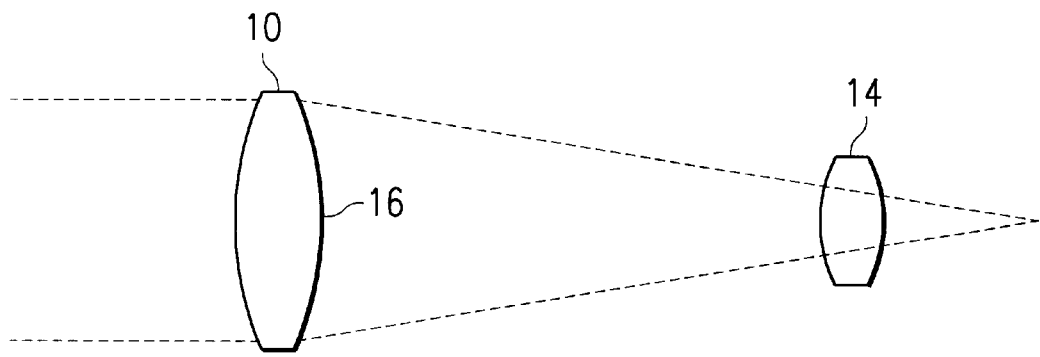
FIG. 2 shows a simplified view of an imager with a diffractive surface on the objective lens.
Figure 3:
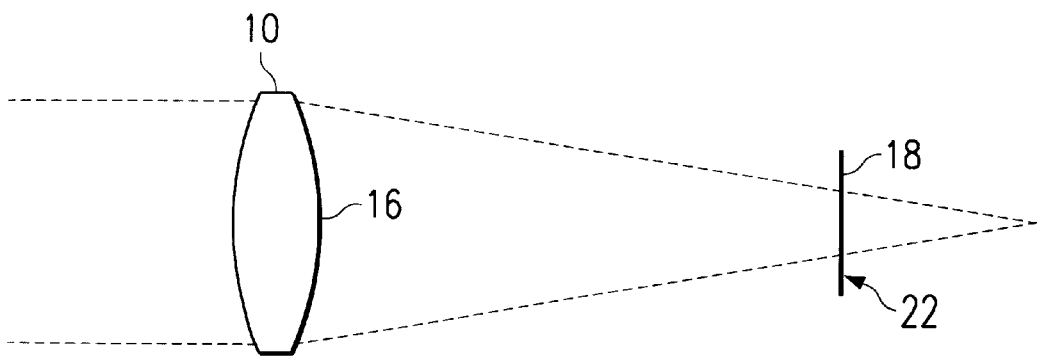
FIG. 3 shows simplified view of an imager with a diffractive surface on the objective lens and a polymer field lens.
Figure 4:
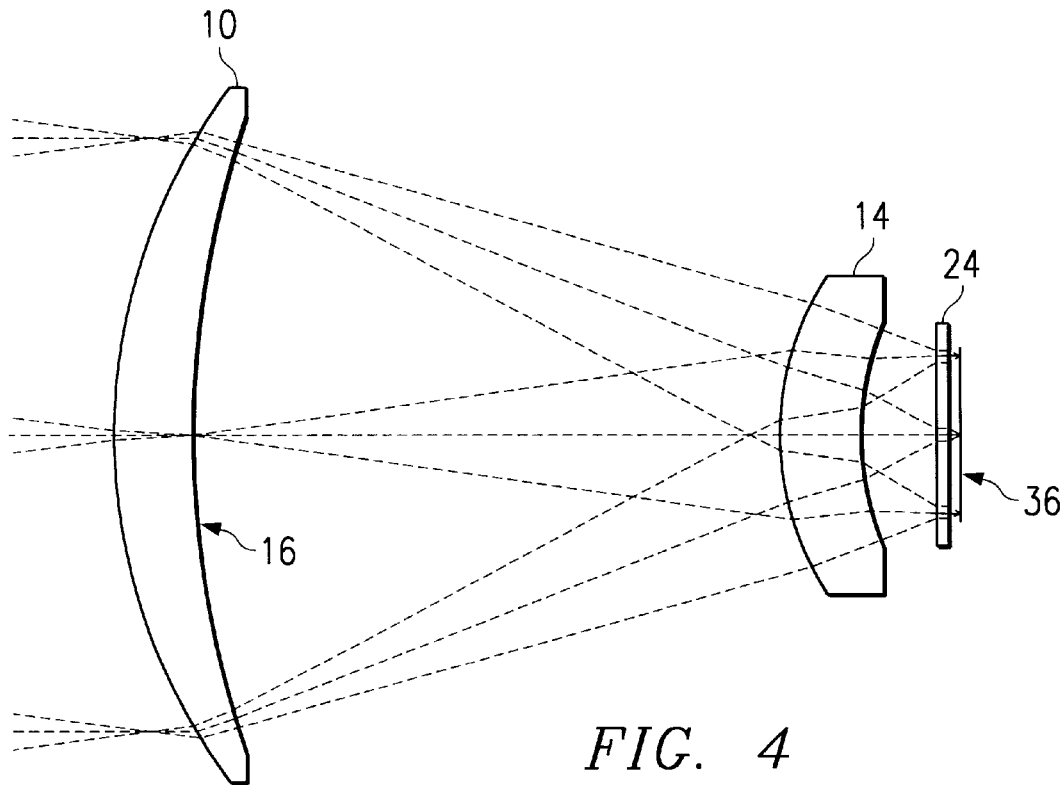
FIG. 4 shows a 12° horizontal FOV imager with a diffractive surface on the objective lens.
Figure 14:
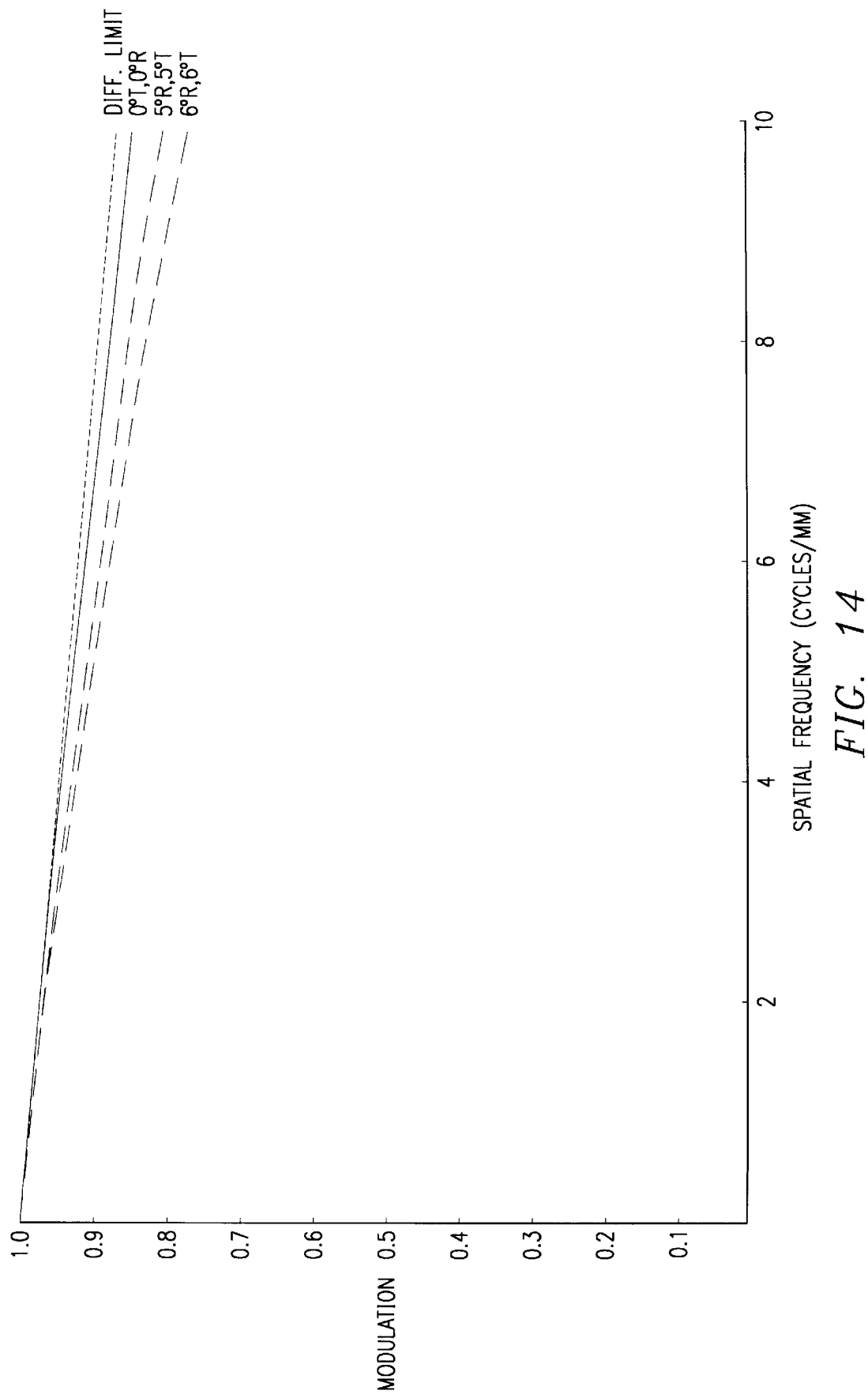
FIG. 14 shows the theoretical MTF of the 12° FOV imager of FIG. 4.

When designing an infrared imager, several parameters are often considered. These include modulation transfer function (MTF), both on-axis and off-axis; optical transmissivity; cost; size; weight; durability; and risk. A recent design of a 12 degree horizontal field-of-view (HFOV) imager for the 8 to 12 micron infrared band showed that a conventional imager with a color correcting diffractive surface on the objective lens could deliver good performance (MTF and transmissivity), high durability, and low risk. FIG. 4 shows this initial design and FIG. 14 shows the theoretical MTF of this initial design. However, known techniques did not allow significant cost and weight reductions, while maintaining performance. To solve this problem, I investigated several new classes of designs. Two approaches, replacing both the objective and the field lens with polymer diffractive lenses, and replacing the objective lens with a polymer diffractive lens, did not prove to be practical. However, one class of designs, which FIG. 3 illustrates in simplified form, showed promise. These designs maintained the glass objective with a color correcting diffractive surface, but used a polymer diffractive lens to correct field aberrations, such as astigmatism and coma. The polymer diffractive lens uses the infrared transmitting polymeric sheet taught in copending application titled, Durable Polymeric Optical Systems, Ser. No. 08/289,404 now U.S. Pat. No. 5,629,074. This sheet is fabricated into a lens by forming a diffractive pattern on one or both sides. Typically, the diffractive pattern is embossed, but other pattern forming methods, such as etching, could be used. When embossing an IR transmitting polymeric sheet, it is preferable to first soften the sheet. Heating an IR transmitting polymeric sheet will soften it. Temperatures on the order of 150 degrees Celsius provide good results; but the diffractive pattern needs to be formed oversize to allow for shrinkage during cooling. An embossed diffractive could be a binary approximation. However, it is preferable to diamond point turn (DPT) a pure kinoform into an embossing tool.

Figure 5:
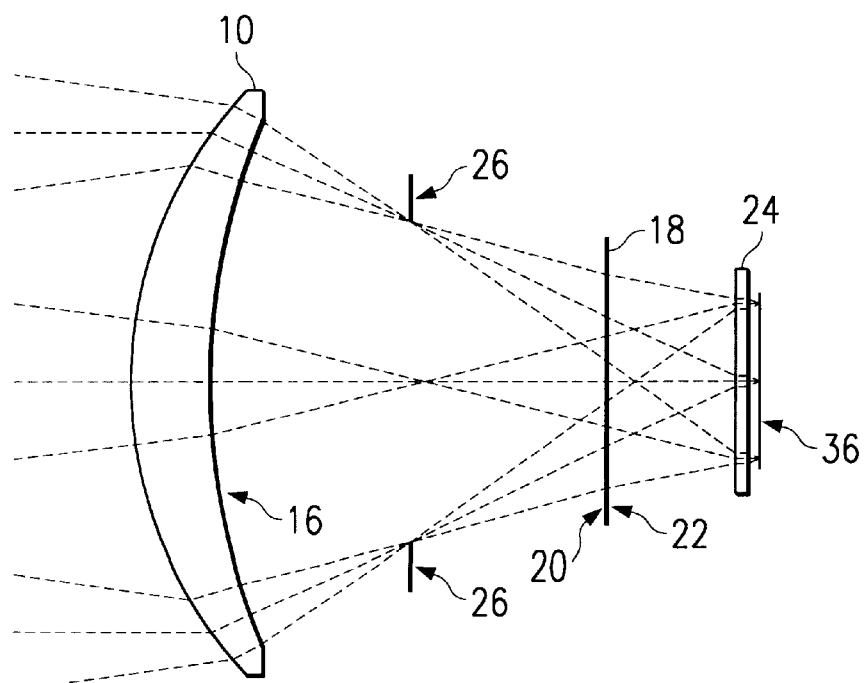
FIG. 5 shows a 12° horizontal FOV imager according to an embodiment of the current invention.
Figure 6:
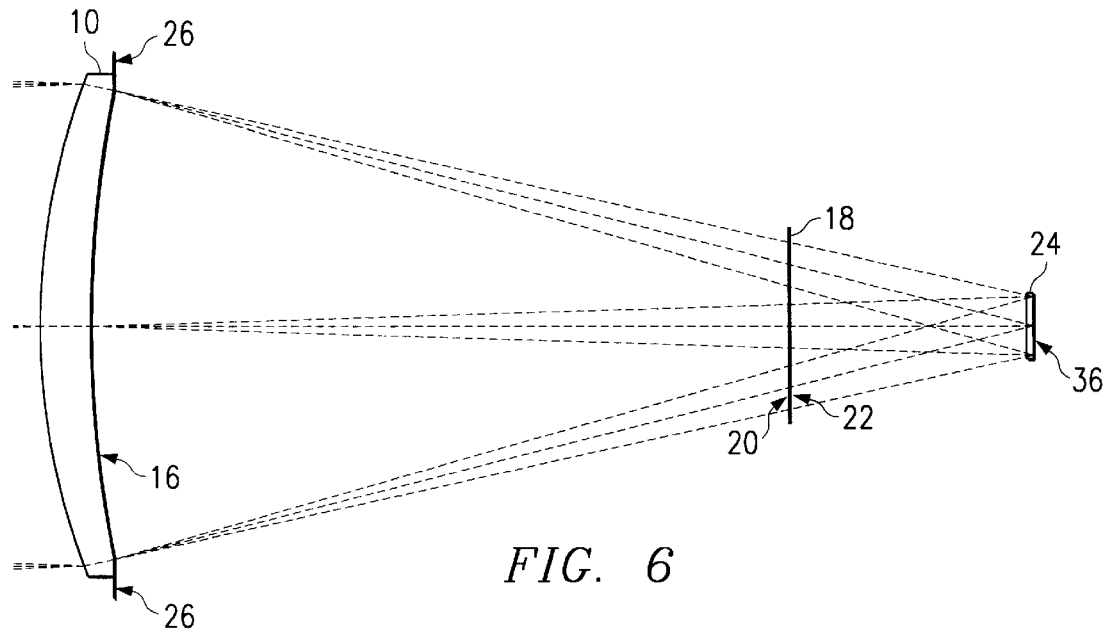
FIG. 6 shows a 3° horizontal FOV imager according to an embodiment of the current invention.
Figure 15:
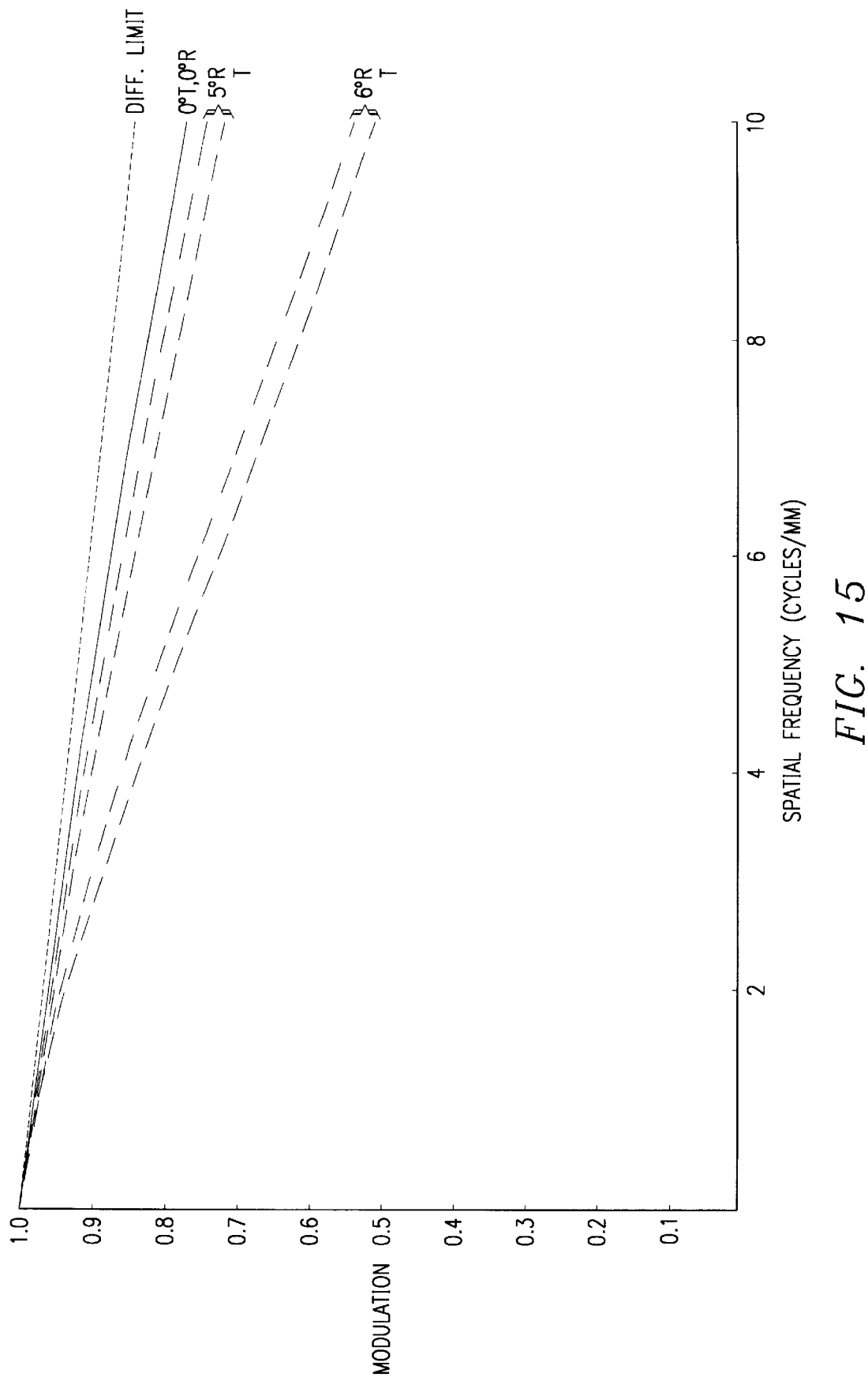
FIG. 15 shows the theoretical MTF of the 12° FOV imager of FIG. 5.

This investigation failed to produce a design that matched the MTF performance of the FIG. 4 design. However, a slightly lower performing design was possible. This design, shown in FIG. 5, is also a 12° HFOV design, but lighter and lower cost than the FIG. 4 design. As FIG. 15 shows, the off-axis MTF performance is noticeably less than the MTF of the FIG. 4 design. The FIG. 5 imager comprises an objective lens 10, with a color correcting diffractive surface 16, a substantially flat, diffractive field lens 18, formed from an IR transmitting polymer, with a first surface diffractive pattern 20, and a second surface diffractive pattern 22. FIG. 5 also shows a stop 26, a detector window 24, and the image plane 36, but does not show either a chopper or a scan mirror, as are commonly used in some types of IR systems. FIG. 6 shows a similar imager with a 3 degree HFOV. In embodiment, stop 26 is located near the objective 10 mounting surface. Table 1 gives a summary of the rent figure elements.

TABLE 1

Figure Elements

| Ref # | Specific Example | Functional Description | Preferred Alternates |
|---|---|---|---|
| 10 | TI-1173 | Objective Lens | Other chalcogenide glass, Ge, ZnS, ZnSe, GaAs, Other IR transmissive materials |
| 12 | ZnSe | Color Correction Lens | Other IR transmissive materials |

TABLE 1-continued

Figure Elements

| Ref # | Specific Example | Functional Description | Preferred Alternates |
|---|---|---|---|
| 14 | Ge | Field Lens | Other IR transmissive materials |
| 16 | Color Correcting Diffractive Surface | First Diffractive Surface | |
| 18 | Double sided diffractive polymer lens | Diffractive Field Lens | Single sided diffractive polymer lens w/ subwavelength structure, Single sided diffractive polymer lens, Other IR transmissive materials with diffractive surface (s) |
| 20 | First Field Correcting Diffractive Surface | Diffractive Field Lens First Surface | Subwavelength structure, flat surface |
| 22 | Second Field Correcting Diffractive Surface | Diffractive Field Lens Second Surface | First field correcting diffractive surface, subwavelength structure, flat surface |
| 24 | Ge | Detector Window | Other IR transmissive materials |
| 26 | | Stop | Stop integrated with lens amount |
| 28 | Single sided diffractive polymer lens | Diffractive color Correction Lens | Single sided diffractive polymer lens with AR subwavelength structure, single sided diffractive lens that corrects chromatic and non-chromatic aberrations, dual sided diffractive lens that corrects chromatic and non-chromatic aberrations, Other IR transmissive materials with diffractive surface (s) |
| 30 | Two element objective with diffractive lens that corrects chromatic aberrations | Diffractive Achromat | Two element objective group with diffractive lens that corrects chromatic and non-chromatic aberrations, Multi-element objective group with diffractive lens |
| 32 | Blocking | Chopper | Defocusing |
| 34 | | Fold Mirror | Multiple fold Mirrors, pivoting mirror, interface mirror |

This particular design uses a diffractive field lens 18 with both a first surface diffractive pattern 20, and a second surface diffractive pattern 22. Another embodiment of this design uses only a single diffractive pattern to correct the same aberrations as this dual pattern design. The dual pattern design was chosen because first pattern 20 and second pattern 22 are each simpler than a single pattern that corrected the same aberrations. A diffractive field lens 20 with a single diffractive pattern could have the single diffractive pattern as either a first surface diffractive pattern 20 or a second surface diffractive pattern 22. One advantage of a field lens with a single diffractive pattern is that it allows the other side of the lens to comprise an anti-reflective sub-wavelength structure (a type of graded index), thus reducing Fresnel reflection losses. Physical Optics Corp. can manufacture embossing tools suitable for forming antireflective sub-wavelength structures on a flat surface of an optical element.

Figure 7:
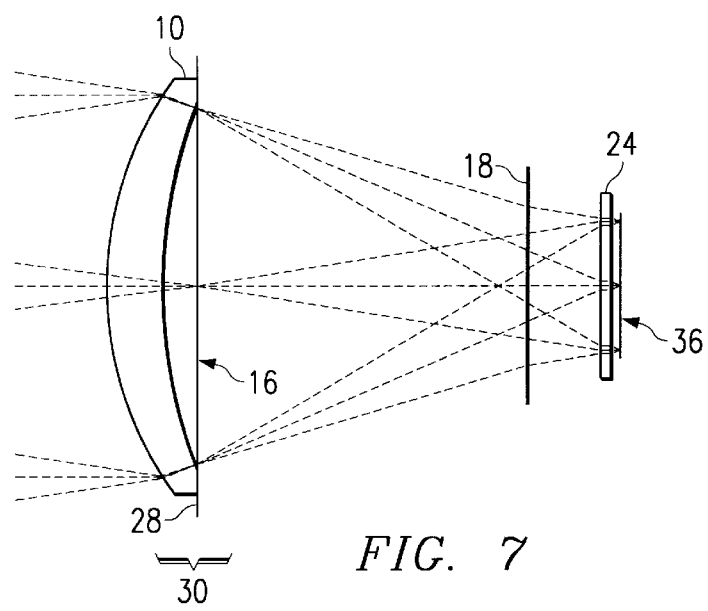
FIG. 7 shows a 12° horizontal FOV imager according to an embodiment of the current invention.

In another embodiment, the color correcting diffractive surface has been removed from objective lens 10. Instead, the color correcting diffractive surface 16 is formed on diffractive color correction lens 28, as shown in FIG. 7. In this embodiment, glass objective lens 10 and diffractive color correction lens 28 cooperate to form a diffractive achromat 30. This diffractive achromat is lower cost and lighter than a standard color correction scheme using two refractive lenses. In some applications, the low cost of polymer diffractive lenses may cause this diffractive achromat to be preferred over a diffractive surface on the objective lens. A diffractive achromat may show additional advantages when combined with a low performance lens, such as a low cost objective lens 10 with spherical surfaces. The color correcting diffractive surface 16 can be modified to also correct for aberrations due to a non-ideal objective lens, such as spherical aberrations. Alternately, the single diffractive surface could be split into 2 simpler diffractive surfaces, one on each side of diffractive lens 28. If diffractive lens 28 has only one diffractive surface, it may be preferable to form an anti-reflective sub-wavelength structure on the other surface, as described below.

Figure 11:
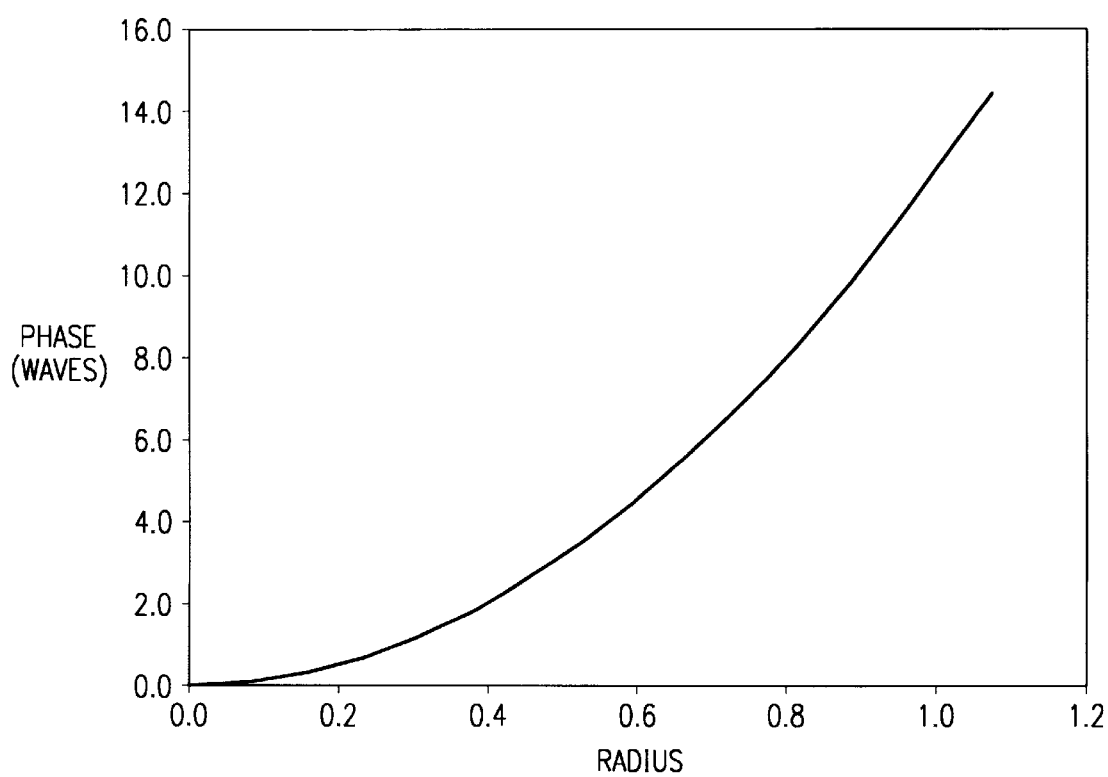
FIG. 11 shows a plot of phase vs. radius for the color correcting diffractive surface of the FIG. 7 imager.
Figure 12:
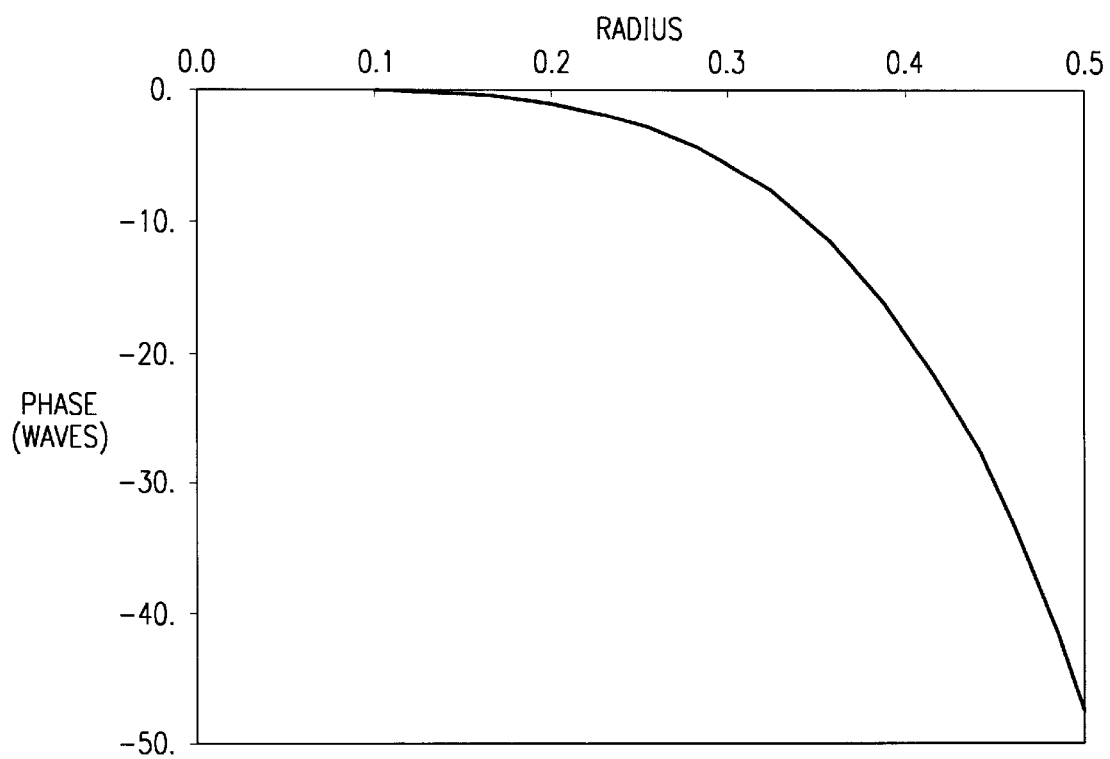
FIG. 12 shows a plot of phase vs. radius for the first field correcting diffractive surface of the FIG. 7 imager.
Figure 13:
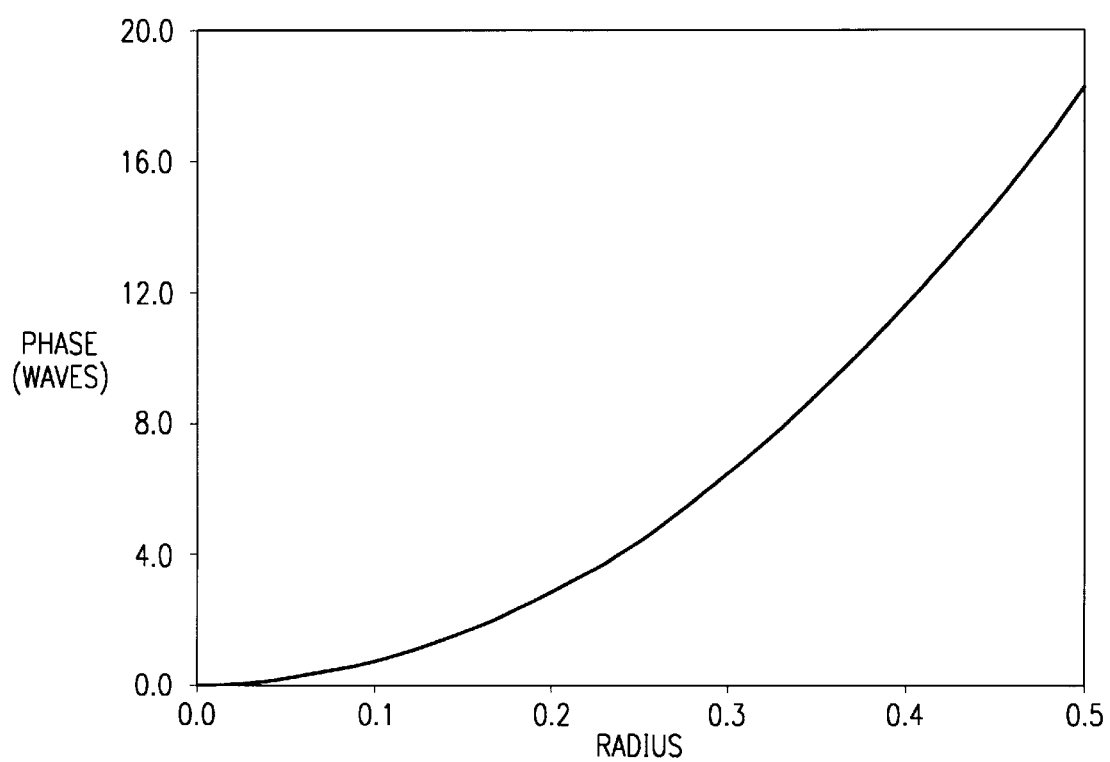
FIG. 13 shows a plot of phase vs. radius for the second field correcting diffractive surface of the FIG. 7 imager.
Figure 16:
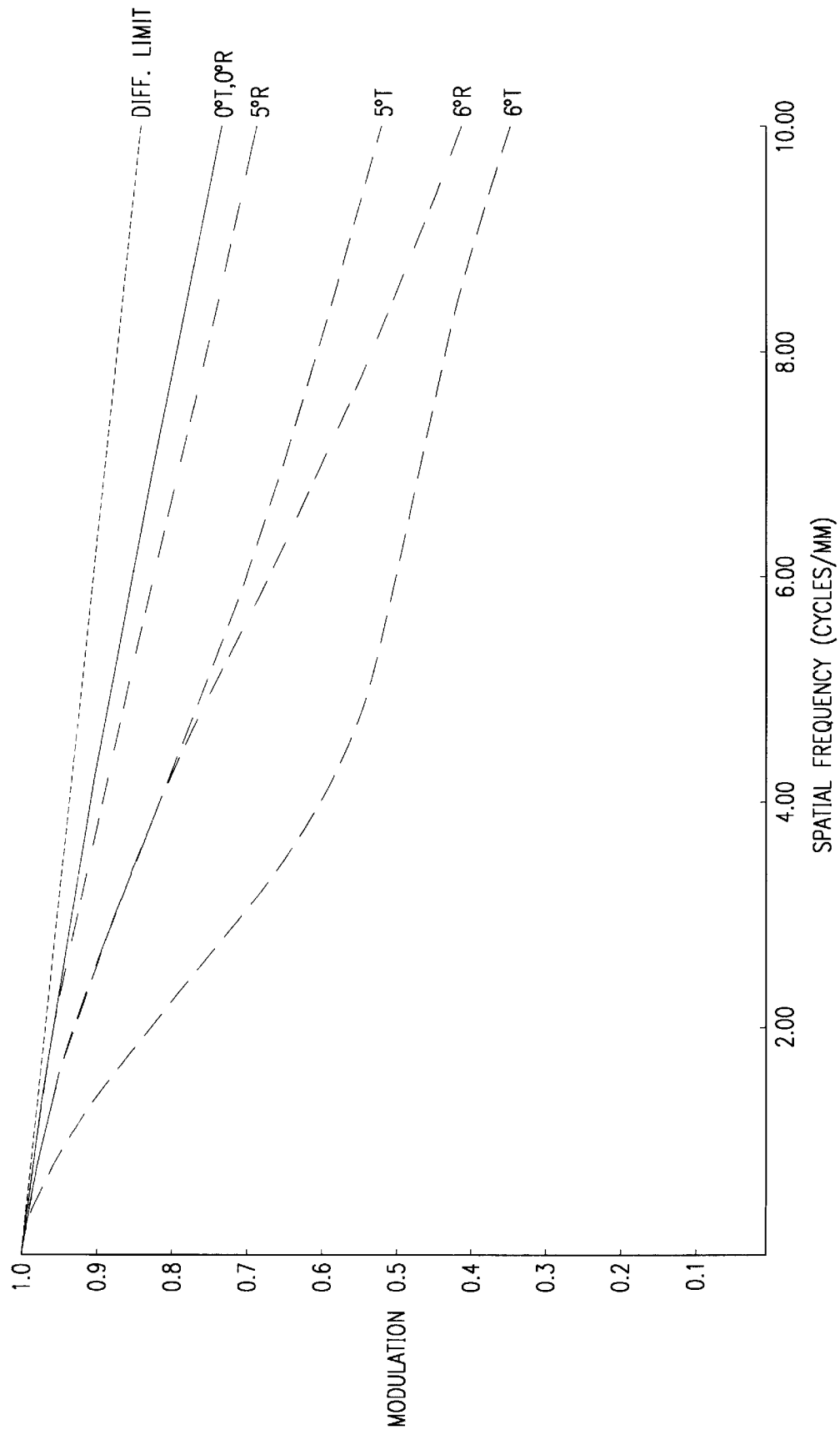
FIG. 16 shows the theoretical MTF of the 12° FOV imager of FIG. 7.

Table 2 shows the prescription and FIG. 16 shows the MTF performance of an embodiment of this design. FIG. 11, FIG. 12, and FIG. 13 show the phase vs. radius plots for the color correcting diffractive surface 16, the first field correcting diffractive surface 20, and the second field correcting diffractive surface 22, respectively. It should be noted that this information is only an illustrative example and should not be construed to limit the present invention.

TABLE 2

Optical Design of an IR Imager

| No | Element | R1 | R2 | Thick | Mat'l | Dia. | Other | |
|---|---|---|---|---|---|---|---|---|
| 10 | Obj. | 2.174 | Asp. | .350 | TI-1173 | 2.520 | Surface 2: A = .00300425 B = .00203632 C = −.0000206998 D = .0000138271 | RD = 3.59789 K = 0 |
| | Airgap | | | .195 | | | | |
| 28 | Color Diff. | Flat | Flat | .002 | Polymer | 2.520 | Surface 2: C2 = 0 | C1 = .005119 C3 = 0 |
| 26 | Stop Airgap | | | 1.9475 | | 2.196 | | |

TABLE 2-continued

Optical Design of an IR Imager

| No | Element | R1 | R2 | Thick | Mat'l | Dia. | Other | |
|---|---|---|---|---|---|---|---|---|
| 18 | Diff. Field Lens | Flat | Flat | .0025 | | 1.200 | Surface 1:<br>C2 = −.26909<br>Surface 2:<br>C2 = 0 | C1 = 0<br>C3 = −.22201<br>C1 = .029888<br>C3 = 0 |
| | Airgap | | | .418 | | | | |
| 24 | Window | Flat | Flat | .05 | Ge | | | |
| | Airgap | | | .03 | | | | |
| 36 | Image | | | | | | | |

Aspheric Eqn:

$$\text{Sag} = \frac{CC^+Y^2}{1 + \text{SQRT}[1 - (1 + K)^+ CC^{2+} Y^2]} + A^+ Y^4 + B^+ Y^6 + C^+ Y^8 + D^+ Y^{10}$$

Where, CC = 1/RD, and Y is the semidiameter (radius)
Diffractive Eqn:

$$\text{Sag} = \left[ \frac{CL*Y^2 + C2*Y^4 + C3*Y^6}{N1 - N2} - \frac{\text{Lambda}}{N1 - N2} * \text{INT}\left(\frac{C1*Y^2 + C2*Y^4 + C3*Y^6}{\text{Lambda}}\right) \right] * \text{Hor}$$

Figure 8:
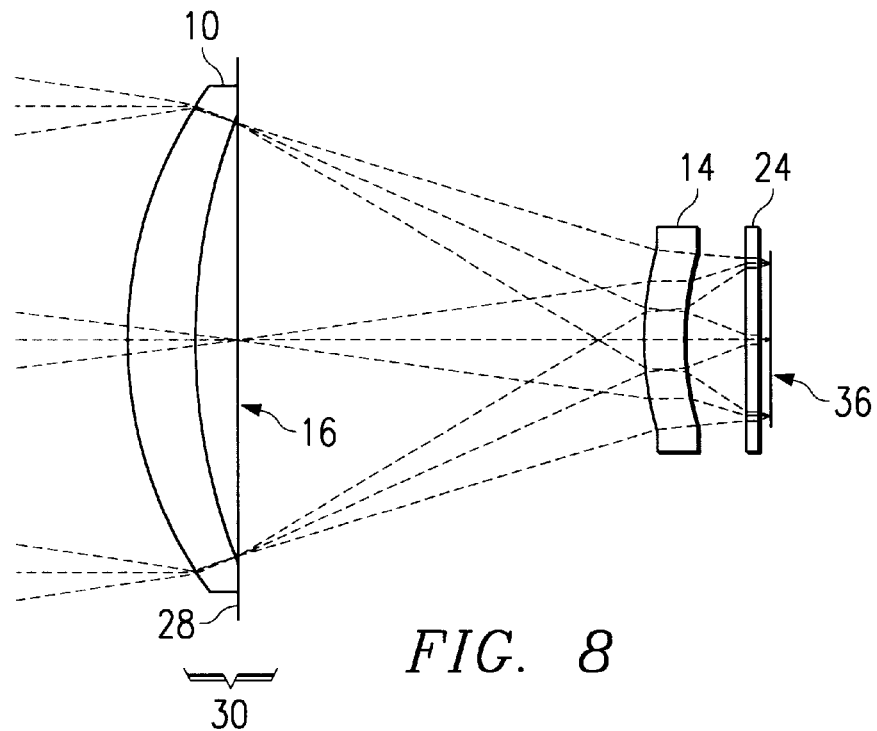
FIG. 8 shows a 12° horizontal FOV imager according to an embodiment of the current invention.
Figure 17:
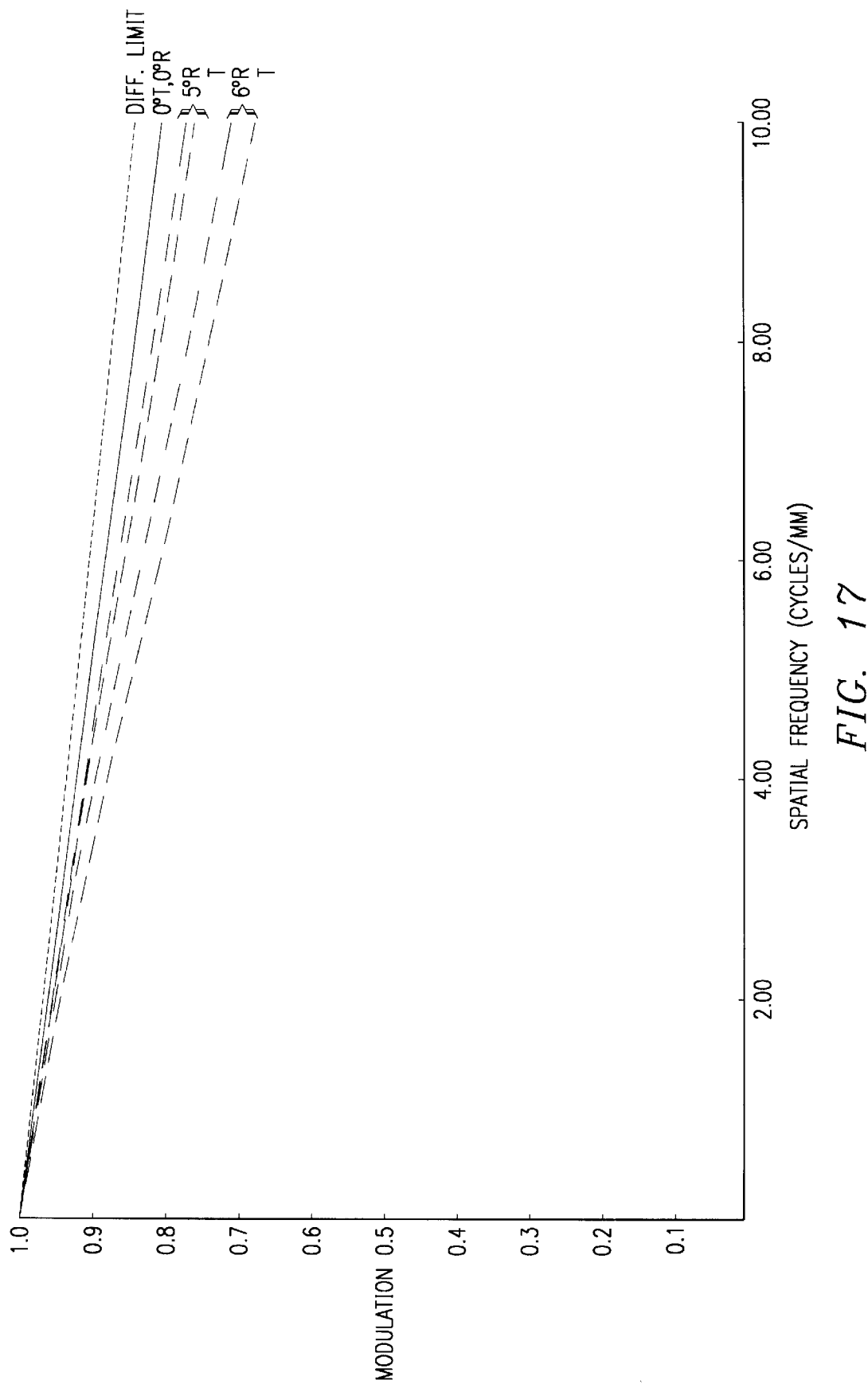
FIG. 17 shows the theoretical MTF of the 12° FOV imager of FIG. 8.

Where, N1 = 1.50, $N_2$ = 1, Lambda = 10.2 μm, Hor = −1, and
Y is the semidiameter FIG. 8 shows another embodiment of this invention. This approach uses a conventional refractive field lens 14, with the diffractive achromat 30 from the FIG. 7 design. FIG. 17 shows that this design exhibits improved off-axis MTF performance over the FIG. 7 design.

Figure 9:
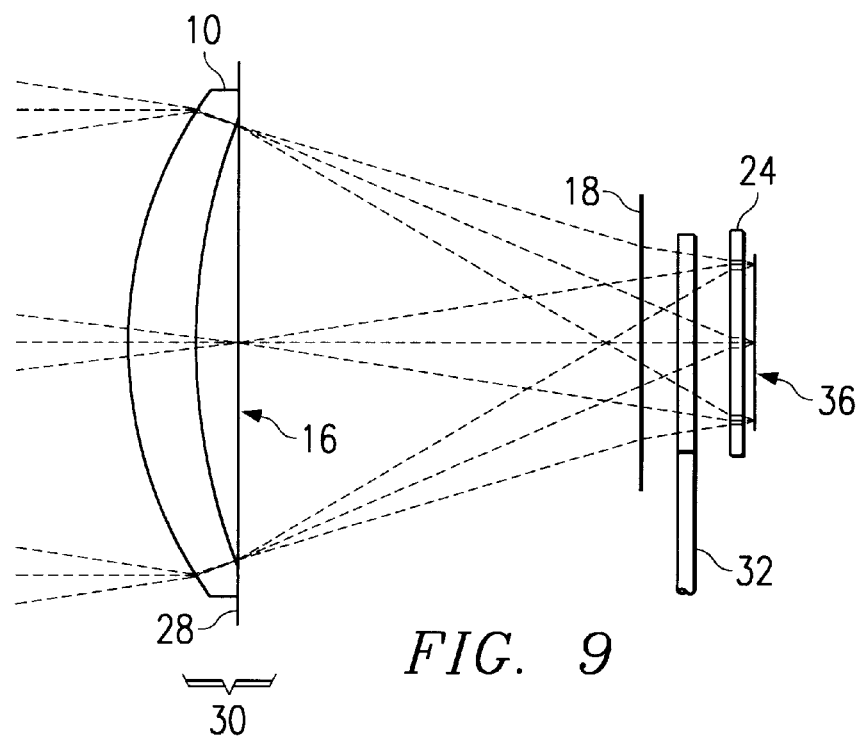
FIG. 9 shows a chopper inserted in the optical path of an imager according to an embodiment of the current invention.

FIG. 9 shows an infrared imager similar to FIG. 7, but incorporating a chopper 32 in front of the window 24. This chopper modulates the optical energy incident on the image plane 36, as required by some types of staring IR systems. There are many chopper designs known in the art. One type is an optically transparent window with an opaque pattern on portions of the window. In operation, the chopper 32 spins. When the opaque portion of the chopper enters the ray bundle, it blocks optical energy (from at least a portion of the scene) from reaching the detector located at the image plane. Other choppers replace the opaque portion with an optical element(s). One such scheme uses an optical diffuser or some other optical element, such as an array of microlenses, to defocus or spoil the image at the image plane. Although these choppers use elements with optical power, they are not using them to form an image; but, instead, to spoil the image. A chopper 32 is typically located where the optical ray bundle is small, such as between the field lens 18 and the window 24. However, some designs may locate the chopper in other locations.

Figure 10:
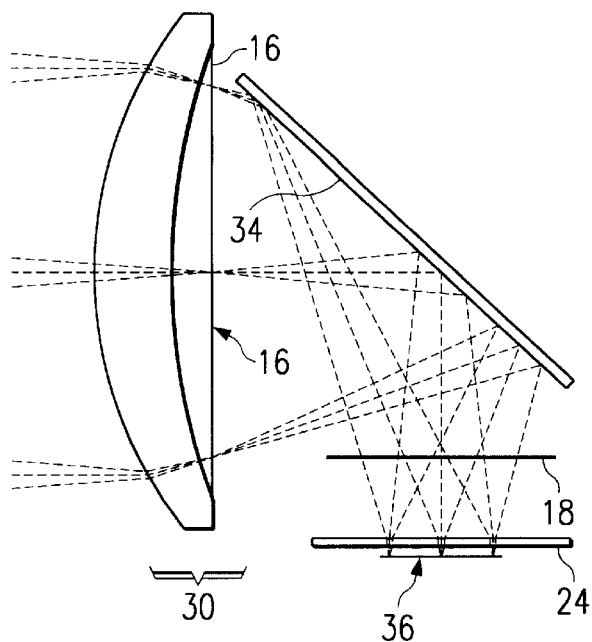
FIG. 10 shows a folded imager according to an embodiment of the current invention.

FIG. 10 shows an infrared imager similar to FIG. 7, but incorporating a fold mirror 34 between diffractive achromat 30 and diffractive field lens 18. The use of one or more fold mirrors and/or other elements without optical power (such as windows) are common packaging techniques. In some systems, including but not limited to scanning IR systems, a fold mirror may be mounted on a pivot. This would allow the mirror to be rotated, thus shifting the scene location at the image plane 36.

Figure 18A:
FIGS. 18A through 18H show several types of diffractive achromatic lens groups.
Figure 18B:
Figure 18C:
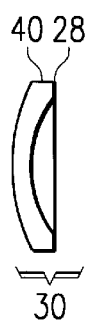
Figure 18D:
Figure 18E:
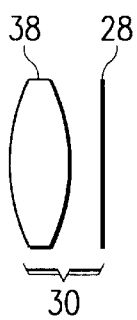
Figure 18F:
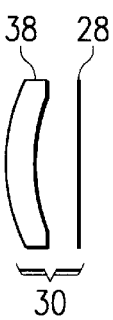
Figure 18G:
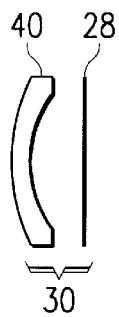
Figure 18H:
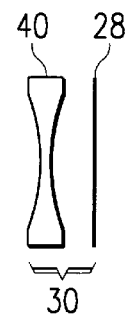
Figure 19A:
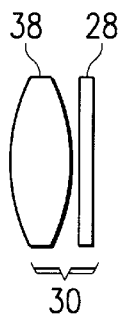
FIGS. 19A through 19D show several diffractive achromatic lens groups with color correcting diffractive lenses formed from alternate materials.
Figure 19B:
Figure 19C:
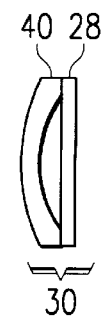
Figure 19D:
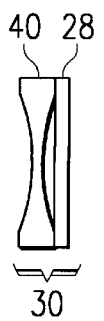

The invention is not to be construed as limited to the particular examples described herein, as these are to be regarded as illustrative, rather than restrictive. The invention is intended to cover all processes and structures that do not depart from the spirit and scope of the invention. For example, in diffractive achromat group 30, it is preferable to mount the diffractive color correction lens 28 to a flat surface of objective lens 10. However, acceptable performance can be obtained at locations displaced from the objective lens. Additionally, the preceding examples of diffractive achromat 30 show a positive meniscus lens. However, FIGS. 18A through 18H show several different configurations of diffractive achromats. The diffractive achromats include groups with positive refractive lenses 38, such as biconvex and meniscus. The diffractive achromats also include groups with negative refractive lenses 40, such as biconcave and meniscus. Although this patent focuses on polymer-based color correcting diffractive lenses, other transparent materials with color correcting diffractive surfaces could be used instead. FIGS. 19A through 18H show diffractive achromats with thicker diffractive lenses.

This patent uses diffractive optics with kinoform patterns formed on the surface. However, other types of diffractive elements, such as binary diffractive and holographic-based diffractive elements, can be used to provide the optical corrections taught herein.

This patent has used IR transmitting optics for its examples. However, all the techniques and principles described herein are also applicable to visible optics. Instead of using IR transmitting refractive and diffractive elements, visible transmitting elements can be used. The preferred diffractive element for visible light may not be kinoform diffractive elements. However, there are many techniques known in the art, including binary and holographic, for forming diffractive optical elements for use at visible wavelengths.

What is claimed is:

1. An infrared imager comprising:
   an infrared transmitting glass objective lens having a surface with a color correcting diffractive pattern; and
   an infrared transmitting polymeric field lens having a substantially flat surface with a first field-correcting diffractive pattern, the first field-correcting diffractive pattern operating to reduce aberrations of an image.

2. The imager of claim 1, further comprising a second field correcting diffractive pattern on the field lens, the first and second field-correcting diffractive patterns cooperating to reduce aberrations of the image.

3. The imager of claim 1, wherein the objective lens glass is selected from the group consisting of Ge, chalcogenide glass, ZnS, ZnSe, GaAs, and TI-1173 glass.

4. An infrared imager comprising:
an infrared transmitting achromatic lens group, the group comprising an infrared transmitting glass objective lens, and a second infrared transmitting lens having a substantially flat surface with a surface diffractive pattern, the surface diffractive pattern cooperating with the glass lens to reduce chromatic aberrations; and an infrared transmitting polymeric field lens having a substantially flat surface with a first field-correcting diffractive pattern, the first field-correcting diffractive pattern operating to reduce aberrations of an image.

5. The imager of claim 4, further comprising a second field-correcting diffractive pattern on the field lens, the first and second field-correcting diffractive patterns cooperating to reduce aberrations of the image.

6. The imager of claim 4, wherein the objective lens glass is selected from the group consisting of Ge, chalcogenide glass, ZnS, ZnSe, GaAs, and TI-1173 glass.

7. The imager of claim 4, further comprising a fold mirror.

8. The imager of claim 4, further comprising a chopper between the field lens and the image.

9. The imager of claim 4, wherein the objective lens is a meniscus lens.

10. An infrared imager comprising:
objective optics selected from the group consisting of
1) an infrared transmitting, refractive objective lens having a first surface and a second surface, and
2) an infrared transmitting achromatic lens group, the group including an infrared transmitting, refractive objective lens, and a second infrared transmitting lens having a substantially flat surface with a surface diffractive pattern, the surface diffractive pattern cooperating with the refractive lens to reduce chromatic aberrations; and
an infrared transmitting field lens having a third surface and a fourth surface, one of the field lens surfaces including a diffractive pattern that reduces aberrations of an image;
wherein the imager does not use any additional elements to form the image, except elements that have no optical power.

11. The imager of claim 10, further comprising an optical element selected from the group consisting of fold mirrors, windows, and filters.

12. The imager of claim 10, further comprising a chopper between the field lens and an image plane.

13. The imager of claim 12, wherein the chopper includes an opaque surface to block optical energy.

14. The imager of claim 12, wherein the chopper includes a defocusing optical element to defocus the image.

15. The imager of claim 10, wherein the objective optics include the refractive objective lens having the first and second surfaces, and wherein one of the first and second surfaces of the refractive objective lens further includes a color correcting diffractive pattern.

16. The imager of claim 10, wherein the third and fourth surfaces of the field lens include diffractive patterns, the third and fourth surface diffractive patterns cooperating to reduce aberrations of the image.

17. The imager of claim 10, wherein the field lens includes a polymer.

18. The imager of claim 17, wherein the surface of the field lens other than the surface having the diffractive pattern includes an anti-reflective sub-wavelength structure.

19. The imager of claim 10, wherein the field lens includes a polymer and the diffractive pattern is embossed.

20. The imager of claim 10, wherein the field lens includes a glass material.

21. The imager of claim 10, wherein the objective optics include the infrared transmitting achromatic lens group, and wherein the surface diffractive pattern of the second infrared transmitting lens further cooperates with the refractive lens to also reduce monochromatic aberrations.

22. An infrared transmitting achromatic lens group, comprising:
an infrared transmitting glass lens; and
a second infrared transmitting lens having a substantially flat surface with a surface diffractive pattern, the surface diffractive pattern cooperating with the glass lens to reduce chromatic aberrations;
wherein the second infrared transmitting lens is a polymeric lens; and
wherein the glass lens is a meniscus lens.

23. The achromatic lens group of claim 22, wherein the polymeric lens is mounted on a flat surface of the glass lens.

24. An infrared transmitting achromatic lens group, comprising:
an infrared transmitting glass lens; and
a second infrared transmitting lens having a substantially flat surface with a surface diffractive pattern, the surface diffractive pattern cooperating with the glass lens to reduce chromatic aberrations;
wherein the second infrared transmitting lens is a polymeric lens; and
wherein the glass lens is a biconvex lens.

25. An infrared transmitting achromatic lens group, comprising:
an infrared transmitting glass lens; and
a second infrared transmitting lens having a substantially flat surface with a surface diffractive pattern, the surface diffractive pattern cooperating with the glass lens to reduce chromatic aberrations;
wherein the second infrared transmitting lens is a polymeric lens; and
wherein the glass lens is a biconcave lens.

26. An infrared imager, comprising:
infrared transmitting objective optics which include a refractive objective lens, and which include a first diffractive structure that is operable primarily to reduce chromatic aberrations; and
infrared transmitting field optics which include a second diffractive structure that is operable primarily to reduce field aberrations, the second diffractive structure being disposed between the objective optics and an image plane.

27. An imager according to claim 26, wherein the field optics includes a non-refractive element having the second diffractive structure thereon.

28. An image according to claim 27, wherein the second diffractive structure includes an approximately flat diffractive surface on one side of the non-refractive element.

29. An imager according to claim 28, including an anti-reflective sub-wavelength structure on a side of the non-refractive element opposite from the diffractive surface.

30. An imager according to claim 27, wherein the second diffractive structure includes first and second approximately flat diffractive surfaces which are disposed on opposite sides of the non-refractive element, and which cooperate to reduce field aberrations.

31. An imager according to claim 27, wherein the non-refractive element is approximately flat and made from a polymeric material.

32. An imager according to claim 31, wherein the second diffractive structure is embossed on the non-refractive element.

33. An imager according to claim 26, wherein the first diffractive structure includes the refractive objective lens having on one side thereof a diffractive surface.

34. An imager according to claim 26, wherein the objective optics includes a non-refractive element, and the first diffractive structure includes an approximately flat diffractive surface provided on one side of the non-refractive elememt.

35. An imager according to claim 34, wherein the non-refractive element is made from a polymeric material.

36. An imager according to claim 26, including a stop disposed optically between the refractive objective lens and the second diffractive structure.

37. An imager according to claim 26, including a chopper disposed optically between the field optics and an image plane.

38. An imager according to claim 26, wherein the objective and field optics are free of other image-forming elements with optical power.

* * * * *

UNITED STATES PATENT AND TRADEMARK OFFICE
CERTIFICATE OF CORRECTION

PATENT NO. : 5,973,827
DATED : October 26, 1999
INVENTOR(S) : Robert B. Chipper

It is certified that error appears in the above-identified patent and that said Letters Patent is hereby corrected as shown below:

Column 1,
Line 32, after "objective", insert --lens--.

Column 2,
Line 5, after "recently", delete "we have used".
Line 6, after "(DPT)", insert --has been used--.
Line 52, after "of", delete "(Se," and insert --(Ge--.

Column 3,
Line 26, after "shows", insert --a--.

Column 4,
Line 12, after "problem," delete "I investigated".
Line 12, after "desiged, insert --were investigated--.

Column 6,
Line 38, after "into", delete "2" and insert --two--.

Column 7,
Lines 20 and 25 see attached sheet for corrections.
Line 26, delete "N$_2$", and insert --N2--.

Column 8,
Line 40, after "this", delete "patent" and insert --invention--.
Line 43, after "FIGS,", delete "19A through 18H show", and insert --19A through 19D show several--.
Line 50, after "this", delete "patent", and insert --invention--.

UNITED STATES PATENT AND TRADEMARK OFFICE
CERTIFICATE OF CORRECTION

PATENT NO. : 5,973,827
DATED : October 26, 1999
INVENTOR(S) : Robert B. Chipper

It is certified that error appears in the above-identified patent and that said Letters Patent is hereby corrected as shown below:

Column 7,
Line 20 delete, $$Sag = \frac{CC + Y^2}{1 + SQRT[1-(1+K)+CC^2+Y^2]} + A^+Y^4 + B^+Y^6 + C^+Y^8 + D^+Y^{10}$$

And insert--

$$Sag = \frac{CC^*Y^2}{1 + SQRT[1-(1+K)*CC^2*Y^2]} + A^*Y^4 + B^*Y^6 + C^*Y^8 + D^*Y^{10}$$

Line 25, delete $$Sag = \left[\frac{CL*Y^2 + C2*Y^4 + C3*Y^6}{N1-N2} - \frac{Lambda}{N1-N2} * INT\left(\frac{C1*Y^2 + C2*Y^4 + C3*Y^6}{Lambda}\right)\right] * Hor$$

And insert --

$$Sag = \left[\frac{C1*Y^2 + C2*Y^4 + C3*Y^6}{N1-N2} - \frac{Lambda}{N1-N2} * INT\left(\frac{C1*Y^2 + C2*Y^4 + C3*Y^6}{Lambda}\right)\right] * Hor$$

Signed and Sealed this

Twenty first Day of August, 2001

*Attest:*

NICHOLAS P. GODICI
*Attesting Officer*   Acting Director of the United States Patent and Trademark Office